March 18, 1958  H. E. ENGLESON ET AL  2,827,148
PACKAGING MACHINE
Filed Oct. 21, 1955  3 Sheets-Sheet 1
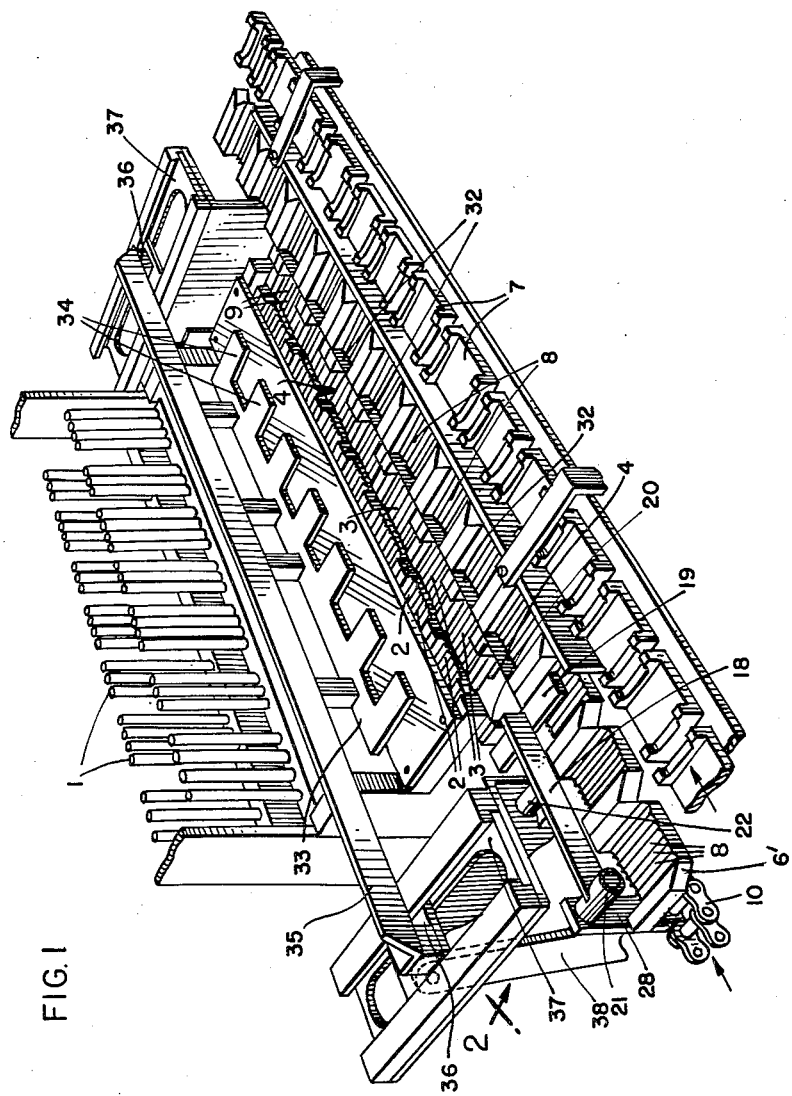
FIG. I
INVENTORS:
HARRY E. ENGLESON
ELMER D. SRAMEK
BY Marzall, Johnston, Cook + Root
ATT'YS

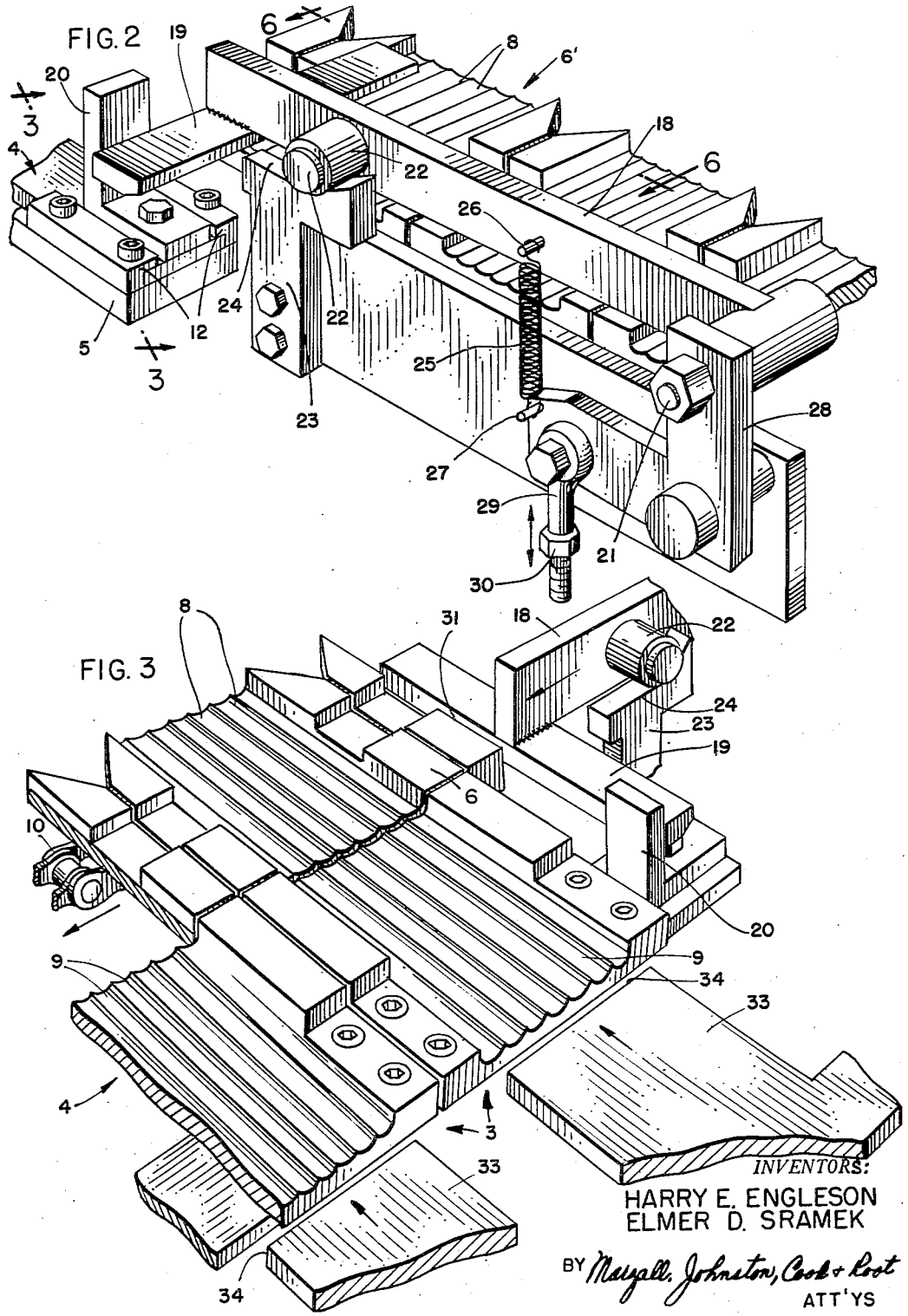

March 18, 1958 H. E. ENGLESON ET AL 2,827,148
PACKAGING MACHINE
Filed Oct. 21, 1955 3 Sheets—Sheet 3

INVENTORS:
HARRY E. ENGLESON
ELMER D. SRAMEK
BY Marzall, Johnston, Cook & Root
ATT'YS United States Patent Office
2,827,148
Patented Mar. 18, 1958

2,827,148

PACKAGING MACHINE

Harry E. Engleson, Chicago, and Elmer D. Sramek, Cicero, Ill., assignors to F. B. Redington Co., Chicago, Ill., a corporation of Delaware Application October 21, 1955, Serial No. 541,976

13 Claims. (Cl. 198—30)

This invention relates to machinery for processing or packaging articles of manufacture, and more particularly to methods and means for loading the articles into buckets of movable conveyers of such machines.

Packaging machinery commonly includes a movable conveyer upon which are mounted especially adapted holders for holding and carrying the articles to be processed and packaged. In the industry, these special holders are known as "buckets," and for purposes of this specification the term "bucket" will be used accordingly.

It is an object of this invention to provide an improved method and means for loading a bucket of a machine with a predetermined number of articles.

Another object is to provide appropriate apparatus which may receive and hold a predetermined number of articles from a filling device and then support the articles in alignment with a bucket into which they may be transferred by a pusher member.

A further object of this invention is to provide improved apparatus whereby several buckets may be simultaneously loaded, thus permitting rapid and efficient mechanical operation.

According to this invention, bucket loading apparatus is provided including a tray with several sections corresponding in dimension to several buckets of an intermittently moving conveyer. The tray is first positioned to be filled with articles from appropriate apparatus and then moved into alignment with the buckets as they rest between intermittent movements. When so aligned, a pusher member engages and presses against the articles and pushes them from the tray sections into the buckets.

Although this invention generally pertains to the loading of moving conveyers with manufactured articles which may be of various forms and sizes, a more complete understanding may be gathered by considering a particular machine designed to package .22-caliber rifle cartridges as described in this specification taken in conjunction with the accompanying drawings in which:

Fig. 1 is a detail perspective view of a portion of a cartridge packaging machine employing this invention;

Fig. 2 is an enlarged fragmentary perspective view looking along the plane 2—2 in Fig. 1 and showing an arm for aligning the loading tray and the movable buckets;

Fig. 3 is a fragmentary perspective view looking along the plane 3—3 in Fig. 2 and illustrating a section of the loading tray as it aligned with a conveyer bucket;

Figure 4:
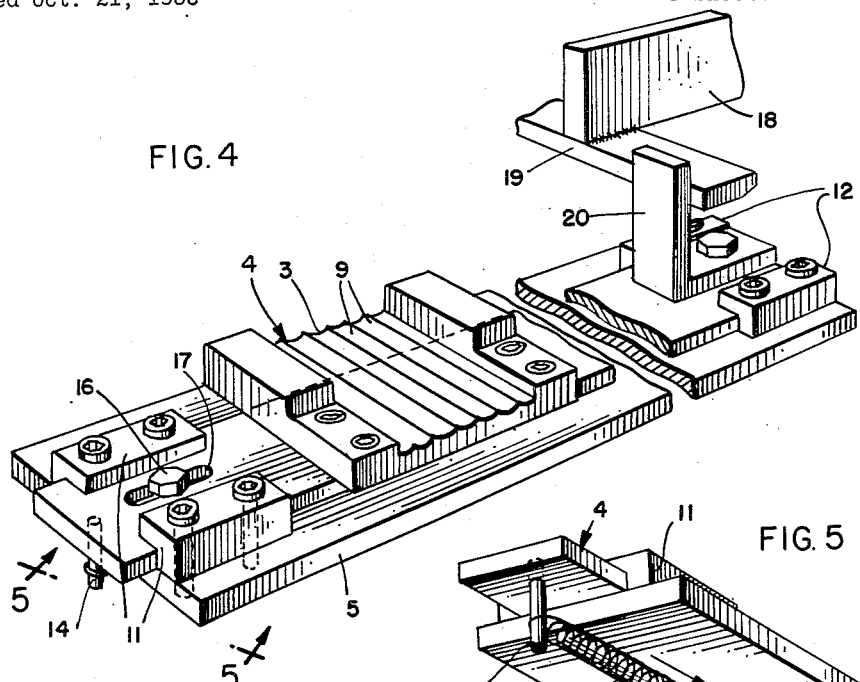
Fig. 4 is a perspective view of the loading tray particularly illustrating its slide mounting.

The rifle cartridges are initially stacked in the two rows of vertical tubes 1 and are guided downwardly therefrom into a grooved structure 2, and are thence urged forwardly into grooved sections 3 of a tray structure 4. The tray 4 is slidably mounted on a support 5 which alternately moves to a lowered position and to a raised position, Figs. 1 and 2.

Figure 7:
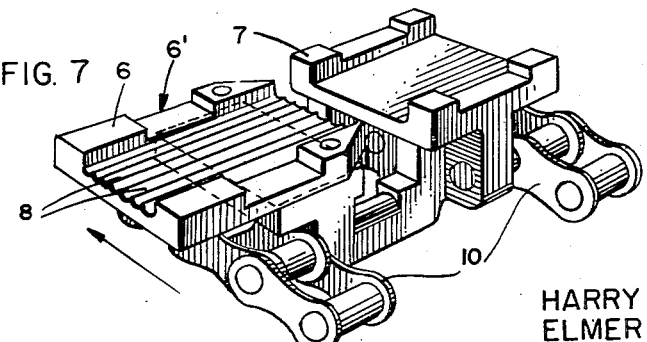
Fig. 7 is a perspective view of a single bucket mounted on the conveyer chains.

The bucket loading tray 4 is an elongated metal platform containing seven sections or pockets, each of which is alternately filled from the grooved structure 2 and is thence emptied by discharging the cartridges into the buckets of an intermittently moving conveyer. The buckets of the conveyer each have a first end 6 having a plurality of grooves for holding the .22-caliber cartridges and having a second end part 7 for holding and transporting cardboard cartons into which the cartridges may be inserted at a subsequent time, Figs. 1 and 7.

The cartridge holding end 6 of the bucket is formed with seven grooves 8, each of which is long enough to contain four cartridges; therefore, a completely loaded bucket will contain twenty-eight cartridges being in four rows and filling the seven grooves 8.

The loading tray 4 likewise is formed in seven grooves 9, and the grooves of the tray correspond both in number and in dimension to the grooved structure 8 of the buckets 6 and to the fixed grooved structure 2 from which the loading tray 4 is filled. The loading tray functions to transport a predetermined number of cartridges from the stationary structure of the machine to the intermittently moving buckets 6', and it is, therefore, arranged to alternately come into alignment with the filling apparatus or stationary grooves 2 and into alignment with the buckets 6 as they rest between the intermittent movements of the conveyer chain 10. Since the filling grooves 2 may be at a level below that of the buckets 6', the supporting structure 5 of the tray may be arranged to move upwardly and downwardly as more specifically set forth in our copending application Serial No. 553,283, filed on December 15, 1955. Since the conveyer chain 10 is subject to wear and may need tightening at periodic intervals, the positions of rest which the buckets will assume between the intermittent motions thereof may vary somewhat with the passage of time and with the continual use of the machine. On the other hand, the stationary cartridge filling structure 2 will remain fixed regardless of the wear on the machine. It is, therefore, necessary that the bucket loading tray 4 be arranged to move in the direction of the conveyer movement to permit the alignment alternately with the fixed structure 2 into the raised positions of the buckets 6.

Figure 5:
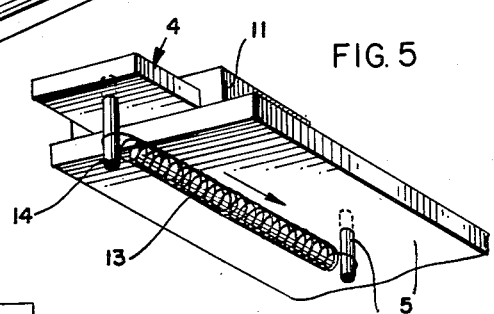
Fig. 5 is a perspective view looking upward along plane 5—5 in Fig. 4 showing a spring which urges the loading tray to the right.

The loading tray 4 is mounted to slide in the guideways 11 and 12 (see Fig. 4). A tension spring 13 (see Fig. 5) is attached by suitable means such as the pins 14 and 15 between the slidably mounted tray 4 and the tray supporting structure 5, and the tray 4 is thereby urged into an extreme position to the right (Fig. 2, 3, 4 and 5) and against a stop which may be a bolt 16 extending through a slot 17 in the tray structure 4 (see Fig. 4). When in the extreme position, abutting against the stop, the grooves 9 of the loading tray sections 3 are then in alignment with the stationary grooves 2 as shown in Fig. 1.

To move the loading tray 4 into position of alignment with the buckets 6' as they rest between intermittent movements of the conveyer chain 10, an alignment arm 18 having a cross member 19 engages an upstanding part 20 attached to the loading tray 4. The aligning arm 18 slides the loading tray in a direction parallel to the conveyer against the tension of the spring 13 into a position of alignment with the buckets 6'. The loading tray 4 to come into alignment with the grooved part 6 of the buckets is, therefore, simultaneously moved both by the supporting structure 5 which raises to the level of the buckets 6' and by the aligning arm 18 which moves the tray longitudinally of the buckets.

As is shown in Fig. 2, the aligning arm 18 is supported at one end by a pivot point 21 and at an intermediate point by a cam roller 22 which rests upon a stationary cam bracket 23. The cam roller 22 is held against a cam surface 24 by the weight of the arm 18 and cross member 19 and also by the tension of a spring 25 attached between the studs 26 and 27. Movement of the aligning arm 18 is accomplished through a bell crank 28 which is in turn driven by a push-pull link 29. The driving motion for the push-pull link 29, as well as for the raising and lowering of the tray supporting structure 5, is derived by conventional means such as cams or cranks from a main drive shaft of the packaging machine (not shown), said main drive shaft also being coupled to drive the conveyer chain 10. Therefore, the aligning motion of the loading tray 4, both vertical and along the slides 11 and 12 thereof, is accomplished in synchronism with the intermittent movements of the conveyer chain 10. By arranging the stationary filling structure 2 and the loading tray 4 with seven pockets or sections, it is possible to simultaneously load cartridges into seven buckets of the conveyer. Therefore, the drive mechanism for moving the supporting structure 5 in a vertical direction and for moving the aligning arm 18 will operate through a cycle which is completed once for every seven intermittent motions of the conveyer.

To provide for wear and stretching of the conveyer chain 10 and for tightening adjustments thereof which may vary the rest positions of the buckets 6', the push-pull link 29 contains a threaded adjustment 30 which may extend or shorten the link and which will thereby vary the extreme position through which the loading tray 4 will slide to come into alignment with the raised positions of the buckets. To properly adjust alignment of the loading tray 5, the threaded means 30 is turned until the cross member 19 comes into slight touching engagement with a side 31 of the bucket when the conveyer is in a rest position between intermittent movements. When this adjustment has been made, the dimensions of the loading tray are such that all of the grooves 9 come into proper alignment with the grooves of the bucket end 6.

Figure 6:
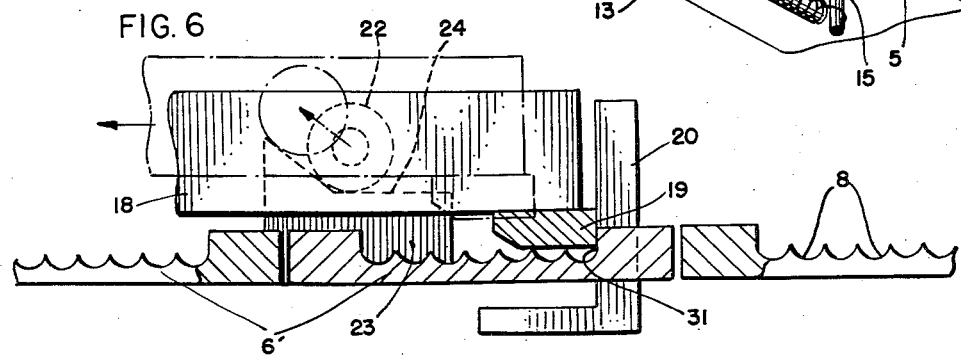
Fig. 6 is a vertical section along the plane 6—6 in Fig. 2 showing the alignment arm in its operative position and illustrating the manner in which it rises for clearance with subsequent moving conveyer buckets.

Fig. 6 illustrates the need for the stationary cam member 23. When the alignment arm 18 is fully extended, the cross member 19 has dropped into a position close to the grooved structure of the bucket 6'. If the cross member 19 were permitted to remain at a low level, there would be interference with the sides of the buckets 6' as the bucket commences its intermittent motion. Therefore, as the aligning arm 18 retracts, the cam roller 22 rides up on the cam surface 24 and the cross member 19 is lifted to provide clearance for the moving buckets 6.

After the loading tray 4 has been filled with cartridges and has been aligned with a group of conveyer buckets 6', a movable divider member 32 positioned between the loading tray and the conveyer bucket (see Fig. 1) is lowered and a pusher member 33, having seven spaced pusher faces 34 protruding forwardly therefrom, advances across the tray sections and pushes the cartridges from the tray onto the conveyer. The pusher member 33 is rigidly mounted and suspended from a supporting bar 35 shown in Fig. 1 as a structural angle member. The ends of the supporting bar 35 rest upon shoes 36 which are mounted to slide in the guideways 37. Each shoe 36 is coupled to the main drive shaft of the machine (not shown) by arms 38 and by further conventional driving elements such as cams, cranks, etc. In a similar manner, the movable divider member 32 is mechanically coupled to the main drive shaft of the machine, and, therefore, the movable divider member 32 and the pusher member 33 will operate in synchronism with the tray supporting structure 5 and the alignment arm 18; all of which operate through a cycle having a duration equal to seven movements of the intermittently moving conveyer. The dividing member 32 functions to break loose any cartridges which may tend to adhere to the pusher faces 34 as the pusher member 33 is withdrawn, completing its cycle of operation. The dividing member 32 further functions as a guard rail since it is positioned immediately adjacent to the buckets 6 of the conveyer and thereby prevents any of the cartridges contained therein from sliding off the conveyer due to vibration and jostling thereof.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. In a machine having an intermittently moving conveyer with buckets thereon, apparatus for loading the buckets, said apparatus comprising a slidably mounted tray positioned adjacent to the conveyer, means coacting with said conveyer for engaging and moving the tray to a position in alignment with the buckets as said buckets rest between intermittent movements, and adjusting means associated with the tray engaging means for adjustably controlling the amount of tray movement for alignment between the tray filling position and the rest positions of the buckets.

2. In a machine having an intermittently moving conveyer with buckets uniformly spaced thereon, apparatus for loading each of the buckets with a predetermined number of articles, said apparatus comprising a slidably mounted tray positioned adjacent to the conveyer and movable along a rectilinear path parallel to the path of the conveyer movement, said tray including a plurality of pockets having the same uniform spacing as a like number of buckets on the conveyer, means for simultaneously filling each of the pockets of the tray with the predetermined number of articles, means operatively associated with the tray for urging the tray into a filling position in alignment with the first means, means coacting with said conveyer for engaging and moving the tray to a position of alignment with the buckets when the conveyer is at rest between intermittent movements, and means associated with the tray engaging means for adjusting the amount of movement to permit corrections of the alignment between the tray and the corresponding buckets.

3. In a machine having an intermittently moving conveyer with buckets thereon, apparatus for loading each of the buckets with a predetermined number of articles, said apparatus comprising a tray positioned adjacent to the conveyer, said tray being movable in the direction parallel to the conveyer, a spring for urging the tray into a filling position against a stop wherein it may be filled with the predetermined number of articles, an alignment arm for engaging and moving the tray against the urging of the spring to a position in alignment with the buckets as said buckets rest between intermittent movements of the conveyer, and a pusher member for pushing the articles from the tray to the buckets.

4. In a machine having a conveyer carrying a plurality of buckets with each bucket having a plurality of grooves, apparatus for loading each of the buckets with a predetermined number of articles, said apparatus comprising a tray having a plurality of sections, each section of said tray having a plurality of grooves corresponding in number and dimensions with the grooves of the buckets, said tray being slidably mounted and movable in the direction parallel to the conveyer, a spring for urging the tray against a stop position, means aligned with the stop position for the filling of the grooves of the tray sections with the articles, an alignment arm for engaging and moving the tray to a position wherein the grooves of the tray sections are in alignment with the grooves of the buckets as said buckets rest between intermittent movements of the conveyer, and a pusher member mounted to move in spaced relation to the sections of the tray for pushing the articles from the tray sections to the buckets.

5. In a machine having an intermittently movable conveyer with a plurality of buckets thereon and with each bucket having a fixed number of parallel grooves, apparatus for loading each of said buckets with a predetermined number of articles, said apparatus comprising a tray having a plurality of sections, each section of said tray having grooves corresponding in number and in dimensions with the grooves of the buckets, said tray being mounted to slide in a direction parallel to the conveyer, a spring means for urging the tray to an extreme position, means positioned in alignment with the grooves when the tray is in the extreme position for filling the grooves of each section with articles which will total the predetermined number for loading into each bucket, an alignment arm for engaging and sliding the tray to a position wherein the grooves of the tray sections are in alignment with the grooves of the buckets as said buckets rest between intermittent movements of the conveyer, a riser cam engaging and raising the alignment arm during the intermittent movements of the line of buckets, and a pusher member mounted to move in spaced relation to the sections of the tray for pushing the articles from the tray sections to the buckets.

6. In a machine having an intermittently movable conveyer with buckets thereon and having a slidably mounted loading tray positioned adjacent to the conveyer, an alignment arm for engaging and moving the loading tray into alignment with at least one bucket when the conveyer is at rest between intermittent movements thereof, said alignment arm being pivotally supported at one end having a cross member attached to the other end, said cross member being positioned to engage and move the loading tray in a direction parallel to the motion of the conveyer, said cross member being further positioned to move into close spaced relation with a part of the conveyer to provide an indexing indication for alignment adjustment.

7. In a machine having an intermittently movable conveyer with buckets thereon and having a slidably mounted loading tray positioned adjacent to the conveyer, an alignment arm for engaging and moving the loading tray into alignment with at least one bucket when the conveyer is at rest between intermittent movements thereof, said alignment arm comprising a pivotally supported end, a cross member attached to the other end, and a cam roller mounted at a point intermittently between the ends, said cross member being positioned to engage and move the loading tray in a direction parallel to the motion of the conveyer, said cross member being further positioned to move into close spaced relation with a part of the conveyer to provide an indexing indication for alignment adjustment, said cam roller being operable to support the alignment arm on a stationary cam surface and being further operable to raise the alignment arm to provide clearance between the cross member and the conveyer buckets during the intermittent movements of the conveyer.

8. In a machine having an intermittently moving conveyer with buckets thereon and having a slidably mounted loading tray positioned adjacent to the conveyer, apparatus for aligning the loading tray with at least one bucket when the conveyer rests between intermittent movements thereof, said apparatus comprising an alignment arm, a driving means pivotally supporting one end of the alignment arm, cooperating means on the alignment arm and on the loading tray for permitting the alignment arm to engage and move the loading tray, and indexing means cooperatively associated with the alignment arm and the conveyer to provide an accurate indication of the alignment between the loading tray and the bucket, thereby permitting adjustments of the driving means for correction of the alignment.

9. In a machine having an intermittently moving conveyer with buckets thereon and having a slidably mounted loading tray positioned adjacent to the conveyer, apparatus for aligning the loading tray with at least one bucket when the conveyer rests between intermittent movements thereof, said apparatus comprising an alignment arm, a bell crank having a first arm pivotally attached to one end of the alignment arm, said bell crank being operable to move the alignment arm in substantially axial direction, a driving link coupled to a second arm of the bell crank, said driving link having threaded adjusting means thereon operable to adjustably vary the movement of the alignment arm, cooperating means on the alignment arm and on the loading tray for permitting the alignment arm to engage and move the loading tray, and indexing means cooperatively associated with the alignment arm and the conveyer to provide an accurate indication of the alignment between the loading tray and the bucket.

10. In a machine having an intermittently moving conveyer with buckets thereon and having a slidably mounted loading tray with a plurality of sections positioned adjacent to the conveyer, apparatus for moving the loading tray such that the plurality of sections come into alignment with a like number of buckets when the conveyer rests between the intermittent movements thereof, said apparatus comprising an alignment arm having a cross member attached to one end thereof, a bell crank having one arm pivotally attached to the alignment arm at the end remote from the cross member, said bell crank being operable to move the alignment arm in substantially axial direction, a driving link coupled to a second arm of the bell crank, said driving link having threaded adjusting means thereon operable to adjustably vary the movement of the alignment arm, the cross member of said alignment arm being operable to engage a part of the loading tray and to thereby move the tray in the slide mounting thereof, said cross member being further operable to move into close spaced relation with a part of a bucket of the conveyer thereby providing an indexing indication to permit adjustment of the threaded adjusting means on the driving link for correcting the alignment between the sections of the loading tray and the buckets of the conveyer.

11. In a machine having an intermittently moving conveyer with buckets thereon and having a slidably mounted loading tray with a plurality of sections positioned adjacent to the conveyer, apparatus for moving the loading tray such that the plurality of sections come into alignment with a like number of buckets when the conveyer rests between the intermittent movements thereof, said apparatus comprising an alignment arm having a cross member attached to one end thereof and a cam roller mounted at an intermediate point thereof, a bell crank having one arm pivotally attached to the alignment arm at the end remote from the cross member, said bell crank being operable to move the alignment arm in substantially axial direction, a driving link coupled to a second arm of the bell crank, said driving link having threaded adjusting means thereon operable to adjustably vary the movement of the alignment arm, the cross member of said alignment arm being operable to engage a part of the loading tray and to thereby move the tray in the slide mounting thereof, and a stationary cam positioned in spaced relation to the cam roller on the alignment arm, said stationary cam and said cam roller being operable to support the alignment arm with the cross member in close spaced relation with a part of the bucket of the conveyer thereby providing an indexing indication to permit adjustment of the threaded adjusting means for correcting the alignment between the sections of the loading tray and the buckets of the conveyer, said stationary cam and said cam roller being further operable to raise the alignment arm to provide clearance between the cross member and the buckets during the intermittent movements of the conveyer.

12. In a machine having an intermittently moving conveyer with buckets thereon, apparatus for loading each of the buckets with a predetermined number of articles, said apparatus comprising a tray positioned adjacent to the conveyer, said tray being movable in the direction parallel to the conveyer, means for normally urging the tray into a filling position against a stop wherein it may be filled with a predetermined number of articles, and means coacting with the conveyer for engaging and moving the tray against the urging means to a position in alignment with the buckets as said buckets rest between intermittent movements of the conveyer.

13. In a machine having an intermittently moving conveyer with buckets thereon, apparatus for loading each of the buckets with a predetermined number of articles, said apparatus comprising a tray positioned adjacent to the conveyer, said tray being movable in the direction parallel to the conveyer, means for normally urging the tray into a filling position against a stop wherein it may be filled with a predetermined number of articles, means coacting with the conveyer for engaging and moving the tray against the urging means to a position in alignment with the buckets as the buckets rest between intermittent movements of the conveyer, and means for transferring the articles from the tray to the buckets.

References Cited in the file of this patent
UNITED STATES PATENTS

| | | |
|---|---|---|
| 1,984,981 | Neff | Dec. 18, 1934 |
| 2,180,163 | Milmoe | Nov. 14, 1939 |